United States Patent
Dardalis

(10) Patent No.: US 9,982,538 B1
(45) Date of Patent: May 29, 2018

(54) METHOD AND APPARATUS FOR ROTATING LINERS IN A ROTATING LINER ENGINE

(71) Applicant: Dimitrios Dardalis, Austin, TX (US)

(72) Inventor: Dimitrios Dardalis, Austin, TX (US)

( * ) Notice: Subject to any disclaimer, the term of this patent is extended or adjusted under 35 U.S.C. 154(b) by 91 days.

(21) Appl. No.: 13/856,964

(22) Filed: Apr. 4, 2013

Related U.S. Application Data

(60) Provisional application No. 61/620,395, filed on Apr. 4, 2012.

(51) Int. Cl.
 *F01B 13/04* (2006.01)
 *F01B 15/00* (2006.01)

(52) U.S. Cl.
 CPC .................. *F01B 15/007* (2013.01)

(58) Field of Classification Search
 CPC .. F02B 59/00; F02B 57/00; F01L 7/02; F01B 15/007; F01B 15/00; F01B 13/00; F01B 13/04
 USPC ............................................ 123/43 R, 193.2
 See application file for complete search history.

(56) References Cited

U.S. PATENT DOCUMENTS 6,289,872 B1 * 9/2001 Dardalis ....................... 123/314

* cited by examiner

*Primary Examiner* — Kevin A Lathers

(57) ABSTRACT

A rotating liner driving mechanism for converting existing engines castings to a rotating liner configuration (RLE) with minor changes to the engine or casting. A pulley is connected to the main accessory belt in the front of the engine and drives a shaft parallel to the crankshaft but external to the engine. Via a 90 degree gearbox, the driving rotation is turned about normal to the crankshaft and block deck face. This shaft drives a driving gear through a gear cover, which then drives one of the liners. Gears in the liner flanges propagate the rotation to all liners. An inline engine needs only one set of pulleys and driving mechanisms, but a V-engine may require two, one for each bank of cylinders. The driving pulley can have mechanisms included so that the gear ratio between crankshaft and rotating liners can be varied during engine operation.

5 Claims, 2 Drawing Sheets

METHOD AND APPARATUS FOR ROTATING LINERS IN A ROTATING LINER ENGINE

RELATED APPLICATIONS

This patent application is related to U.S. Provisional Patent Application No. 61/620,395 filed by applicant on Apr. 4, 2012, and claims the benefit of that filing date.

BACKGROUND

Field of Invention

This invention relates to a method and apparatus for rotating cylinder liners in an internal combustion engine.

Prior Art

This patent application describes improved driving mechanisms for a rotating liner engine (RLE), also called a rotating sleeve engine.

U.S. Pat. No. 6,289,872 for "Rotating sleeve engine" by applicant is incorporated by reference.

SUMMARY OF INVENTION

A rotating liner engine comprises a plurality of cylinders where each cylinder has a piston and a rotating liner. As more fully described in U.S. Pat. No. 6,289,872 and U.S. Pat. No. 7,004,119, engine friction is reduced by rotating a liner so that piston ring friction is significantly reduced.

In one embodiment, an existing heavy duty engine is retrofitted with a belt-driven or motor-driven driving gear. A shaft is provided from the driving gear to a rotating liner gear box to transmit power from the driving gear to rotate a first rotating liner. Each rotating liner includes a gear which engages a gear in each adjacent rotating liner, so that the first rotating liner drives all other rotating liners in alignment with the first rotating liner. In a typical V-8 engine, for example, there are four cylinders on each side of the engine block, so that the driving gear would drive a first rotating liner on each side of the block, and the first rotating liner on each side of the block would drive all other rotating liners on that side of the block.

DETAILED DESCRIPTION OF EMBODIMENT—PULLEY DRIVEN ROTATING LINERS

In a rotating liner engine, a rotating liner is provided in each cylinder, and the liners are rotated at a constant or variable speed.

In the current invention, a first drive gear drive mechanism rotates a first rotating liner in a set of aligned cylinders. The first rotating liner, which may be at any position in the set of aligned cylinders, and each of the rotating liners has a gear which engages all neighboring rotating liners. In this embodiment, the first drive gear drive mechanism is a belt-driven pulley, shaft, and gearbox.

Improvements in Driving Mechanism

When an engine is design from scratch with the rotating liner concept in mind, the designer has many options on how to design the driving mechanism. However, there may be a lot of motivation to convert existing engine designs. We could either want to convert existing engines, or convert the designed engine from the factory, without having to redesign the whole casting. Diesel engines tend to be easier for such a conversion, because the relatively wide main bearings enforce a relatively large bore-bore spacing. Also, as seen in U.S. Pat. No. 6,289,872, it is possible to only drive one liner, and let the liner flange gears mesh so the motion propagates from liner to liner. However, packaging the driving mechanism between the crankshaft and one of the gears is tricky in a pre-existing block design.

Figure 1:
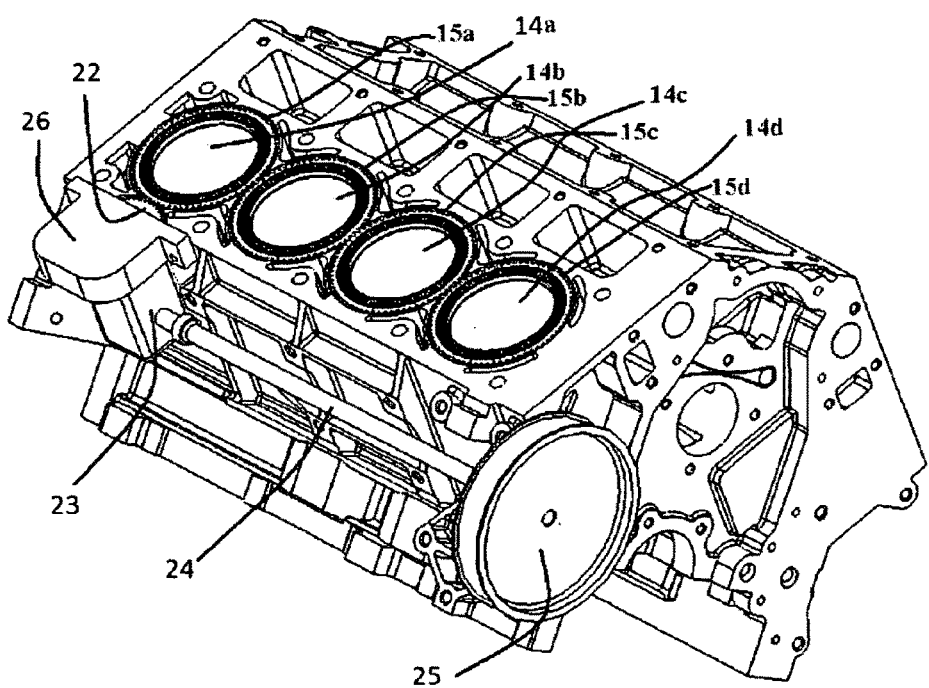
FIG. 1 is a side perspective view of an example semi-external driving mechanism for a V8 engine.

FIG. 1 shows an embodiment of the current invention. In this embodiment, the driving rotation is picked up from the accessory pulley 25. This pulley engages the front accessory belt which typically drives the water pump, alternator, power steering, and other such accessories. The extension shaft 24 transmits the power back to the 90 degree gearbox 23.

Figure 2:
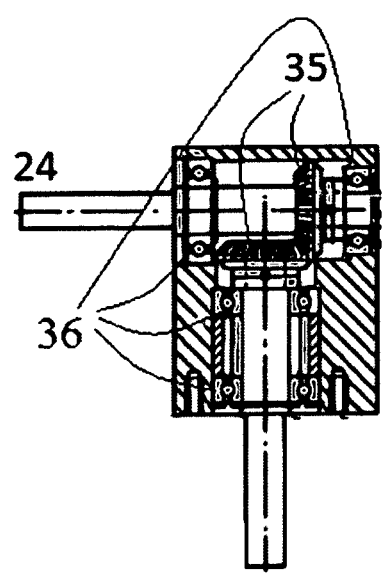
FIG. 2 shows the details of the 90-degree gearbox.

The simple gearbox is available off the shelf, but can be also specifically designed for the application. FIG. 2 shows an example gearbox. In this embodiment the gear box contains two bevel gears 35, so that the rotation of shaft 24 is turned 90 degrees, parallel to the liner rotation. At the upper end of the 90 degree gearbox shaft, the driving gear 22 engages a first rotating liner gear 15a.

The upper deck of the block will be machined to give space for the driving gear 22. This space is not a problem in a rotating liner engine, since we no longer need a head gasket, and the gas sealing is handled by a face seal. The driving gear cover 26 contains all necessary bearings and gaskets to contain the lubricating oil.

The 90 degree gearbox 23 could contain its own separate oil, or it can share oil from the engine. Either way, at least one shaft seal will contain and prevent it from leaking outside the enclosure.

FIG. 1 shows a V-8 engine, where two such mechanisms will be necessary, one on each side of the engine block. In an inline engine, only one mechanism will be necessary. Also, in FIG. 6, the liner of the last cylinder 14a is been driven. The designer has the option to drive any of the cylinders.

In this example, adjacent rotating liners are rotated in a clockwise and opposite counterclockwise direction. In a rotating liner engine, the direction of rotation if a rotating liner is not important.

This approach permits existing engines to be converted to rotating liner engines.

DETAILED DESCRIPTION OF EMBODIMENT—VARIABLE GEAR RATIO DRIVE

In this embodiment, the accessory pulley 25 can have a viscous coupling incorporated into it, which would allow some reduction in liner speed at the high speed ranges, or when the engine is cold and the viscous drag of the liner system is high. In one example, a two speed gearbox or hydraulic coupling plus clutch would be located just behind the pulley.

Other options include an electrically/electronically operated clutch to over-ride the coupling slippage, or a small two speed gearbox with planetary gear and a clutch in order to achieve two different driving ratios, based on load, engine temperature, and speed. For example, when the engine is cold, lower liner speed will be necessary for a given crankshaft speed. This will help reduce liner parasitic losses. Also, at low engine loads and higher engine speeds, reduced liner speed may be sufficient. Reducing liner speeds for these operating conditions will also help reduce liner parasitic loss. This overall strategy would allow a much more careful management of the liner parasitic losses when large variations in engine speeds and loads are anticipated.

DETAILED DESCRIPTION OF EMBODIMENT—MOTOR DRIVEN ROTATING LINERS

In this example, the belt driven pulley, shaft, and gearbox are replaced with an electric motor 37 which turns the driving gear 22 via shaft 38 (FIG. 3). The motor may be variable speed in order to optimize friction reduction.

It is to be understood that the specific embodiments and examples described above are by way of illustration, and not limitation. Various modifications may be made by one of ordinary skill, and the scope of the invention is as defined in the appended claims.

What is claimed is:

1. A rotating liner drive mechanism for a rotating liner engine comprising an engine block, the rotating liner drive mechanism comprising
   a first set of aligned rotating liners comprising
      a first rotating liner comprising a first liner gear, and
      a second rotating liner comprising a second liner gear, such that the second liner gear engages the first liner gear so that the second rotating liner rotates when the first rotating liner rotates;
   a first drive gear drive mechanism comprising
      an accessory pulley,
      a shaft, and
      a gearbox which converts shaft rotation to drive gear rotation;
   a first gear drive mechanism external to the engine block, the first liner drive gear drive mechanism comprising a drive gear that engages the first liner gear.

2. The rotating liner drive mechanism of claim 1 further comprising a variable gear ratio drive.

3. The rotating liner drive mechanism of claim 1 wherein the first liner drive gear drive mechanism further comprises a variable speed electric motor which turns the drive gear.

4. A method of rotating a plurality of liners in a rotating liner engine comprising an engine block, the method comprising
   providing gears on each liner such that each gear engages the gear or gears of neighboring liners;
   providing a rotating liner drive mechanism, the rotating liner drive mechanism comprising
      an accessory pulley,
      a shaft connected to the pulley, and
      a gearbox which converts shaft rotation to drive gear rotation; and
   driving a gear on a first liner with the rotating liner drive mechanism, thereby driving the first liner and all liners in alignment with the first liner.

5. The method of rotating a plurality of liners of claim 4, the rotating liner drive mechanism comprising a variable speed electric motor which turns the drive gear.

* * * * *